April 2, 1929.  L. P. MOON  1,707,532

FRYING PAN

Filed Sept. 7, 1928

WITNESS:
Rob P. Kitchel.

INVENTOR
Lewis P. Moon
BY
Burson Harding
ATTORNEYS.

UNITED STATES PATENT OFFICE.

LEWIS P. MOON, OF PHILADELPHIA, PENNSYLVANIA.

FRYING PAN.

Application filed September 7, 1928. Serial No. 304,447.

This invention relates to a cooking utensil and more particularly to a frying pan adapted for a combination frying of bacon and eggs.

In the frying of bacon and eggs, it is desirable that the fried bacon produced be crisp. If the bacon and eggs are fried together, the bacon is apt to be soft, so that combined frying is sometimes avoided. It is desirable, however, to have the eggs fried in the fat from the bacon, so as to impart a flavor of bacon thereto. It is, accordingly, the object of the present invention to provide a frying pan in which, while the bacon is maintained apart from the eggs so that the product is crisp, the fat, or grease, from the bacon is brought into the portion of the pan containing the eggs so that the eggs are fried therein.

The invention will be best understood by reference to the accompanying drawing, in which.

Figure 1:
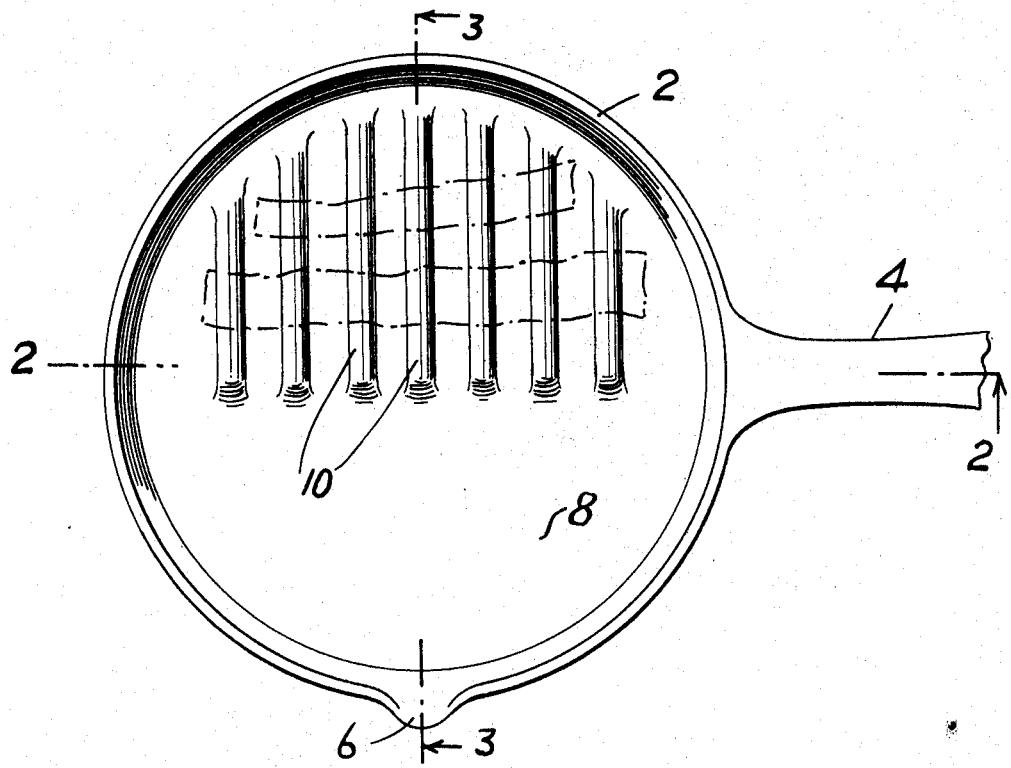
Fig. 1 is a plan view showing the improved frying pan.
Figure 2:
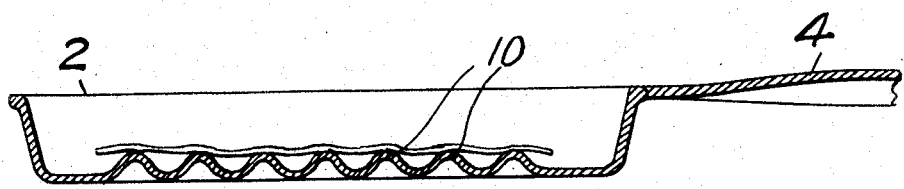
Fig. 2 is a sectional view taken on line 2—2 of Fig. 1.
Figure 3:
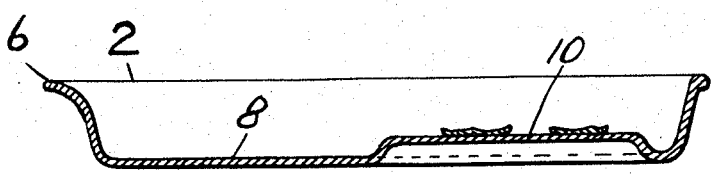
Fig. 3 is a sectional view taken on line 3—3 of Fig. 2.

The frying pan comprises a pan portion 2 consisting of a flat or slightly curved bottom and an upstanding flange surrounding the same. Integral with the flange, or secured thereto in any suitable manner, is a handle 4. The pan may obviously be made of pressed sheet metal or may consist of a casting. A lip 6 is formed in a portion of the upstanding flange in order to provide for ready pouring therefrom of the contents.

A portion 8 of the area of the bottom of the pan is made flat in the usual manner. This area may be approximately half of that of the bottom of the pan. The remaining bottom portion is corrugated, as shown at 10. These corrugations may be formed, as shown in the drawing, by a distortion of the material forming the bottom, or they may be formed by separate ribs raised above the surface of the bottom. Preferably, these ribs are arranged in substantial parallelism so as to define channels communicating with the flat portion 8 of the bottom.

When the frying pan is used, for example, for the frying of bacon and eggs, the eggs are placed on portion 8 of the bottom of the pan, where frying will take place in the usual manner. The bacon is, however, placed over ribs 10 so as to be supported at their vertices. As frying takes place, the fat or grease from the bacon is melted therefrom and flows downwardly into the troughs between ribs 10 and thence over the flat surface 8 where it comes into contact with the eggs, imparting to them the desirable flavor of the bacon. The bacon, by reason of the removal of the grease, is fried to a crisp condition.

What I claim and desire to protect by Letters Patent is:

A cooking utensil comprising a bottom, an upwardly extending flange surrounding the bottom, and a series of substantially parallel ribs extending upwardly from the bottom over a part of the area thereof, the remaining portion of the area being smooth, said ribs defining troughs arranged to lead fluid to the smooth portion of the bottom.

In testimony of which invention, I have hereunto set my hand, at Philadelphia, Pennsylvania, on this 31st day of August, 1928.

LEWIS P. MOON